(12) United States Patent
Stephens, Jr.

(10) Patent No.: US 9,230,017 B2
(45) Date of Patent: Jan. 5, 2016

(54) SYSTEMS AND METHODS FOR AUTOMATED MEDIA COMMENTARY

(71) Applicant: James H. Stephens, Jr., Austin, TX (US)

(72) Inventor: James H. Stephens, Jr., Austin, TX (US)

(73) Assignee: Morphism LLC, Austin, TX (US)

( * ) Notice: Subject to any disclaimer, the term of this patent is extended or adjusted under 35 U.S.C. 154(b) by 122 days.

(21) Appl. No.: 14/155,849

(22) Filed: Jan. 15, 2014

(65) Prior Publication Data

US 2014/0200895 A1 Jul. 17, 2014

Related U.S. Application Data

(60) Provisional application No. 61/753,060, filed on Jan. 16, 2013.

(51) Int. Cl.
*G10L 13/02* (2013.01)
*G06F 17/30* (2006.01)

(52) U.S. Cl.
CPC .... *G06F 17/30769* (2013.01); *G06F 17/30654* (2013.01); *G06F 17/30867* (2013.01)

(58) Field of Classification Search
CPC . G06Q 30/02; G06Q 30/0255; G06N 99/005; G06F 17/30867; G06F 17/30017; G06F 3/0686; G06F 17/30769; G06F 17/30781; H04W 64/00

USPC ........ 704/260, E15.045; 705/346, 14.69, 1.1, 705/14.73; 709/227, 228, 229, 203; 707/710, 769, 912, 916, 661, 754; 725/9, 46; 715/738; 455/563

See application file for complete search history.

(56) References Cited

U.S. PATENT DOCUMENTS

| | | | |
|---|---|---|---|
| 6,557,026 B1 | 4/2003 | Stephens, Jr. | |
| 8,032,378 B2 | 10/2011 | Stephens, Jr. | |
| 8,060,525 B2 * | 11/2011 | Svendsen et al. | 707/769 |
| 8,374,873 B2 | 2/2013 | Stephens, Jr. | |
| 8,375,131 B2 * | 2/2013 | Rogers et al. | 709/227 |
| 8,554,566 B2 | 10/2013 | Stephens, Jr. | |
| 8,732,193 B2 * | 5/2014 | Skeen et al. | 707/769 |
| 2006/0276230 A1 * | 12/2006 | McConnell | 455/563 |

* cited by examiner

*Primary Examiner* — Charlotte M Baker
(74) *Attorney, Agent, or Firm* — Terrile, Cannatti, Chambers & Holland, LLP; Robert W. Holland

(57) ABSTRACT

Techniques for providing automated media commentary are provided. A user agent requests audio commentary for media. In response, a service searches data sources to identify the specified media, finds information related to those entities, generates text that represents those information, combines the text into a textual monologue, and synthesizes speech audio from that textual monologue. The service selects relevant information to be likely unknown to the user while also being desired by the user.

17 Claims, 4 Drawing Sheets

SYSTEMS AND METHODS FOR AUTOMATED MEDIA COMMENTARY

BACKGROUND OF THE INVENTION

1. Field of the Invention

The present invention relates to presenting information about a sequence of media. More specifically, the invention relates to finding information relating to media and presenting that information to a user.

2. Description of the Related Art

Large collections of online music allow listeners to explore unfamiliar music easily, and several services ranging from simple shuffles to sophisticated recommendation engines can select music for listeners. To learn the title or other information about an unfamiliar track, a listener typically consults some textual presentation for that track. Additionally, a user might manually search for information about that track. Many sources of information about the track are available for the user to consult.

SUMMARY OF THE INVENTION

The present invention provides automated commentary for media. First, on the behalf of a user, a user agent sends a request for audio commentary for media. In response, a service retrieves any state associated with the user, and the service searches data sources to identify the specified media, find information related to those entities, generate text that represents that information, combine the text into a textual monologue, and synthesize speech audio from that textual monologue. The service selects relevant information to be likely unknown to the user while also being desired by the user.

The invention provides several advantages. When a user's circumstances can prevent him or her from manually obtaining information for media, the invention can provide that information automatically and audibly. For example, a user who is driving a car and listening to an unfamiliar sequence of songs cannot search the Web to find out who produces a given track or learn the year a song was first released. Furthermore, even if the user could find the information that interests him, he should not read it while driving. Additionally, a user who does attempt to learn more about some media is faced with finding appropriate sources of information, learning how to query them, skipping information the user already knows, dealing with inconsistencies, and integrating results. The present invention eliminates all of these disadvantages of the related art.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In the description that follows, the present invention will be described in reference to embodiments that generate and present information about media. More specifically, the embodiments will be described in reference to searching for novel information about media, generating a textual representation of a subset of that information, and synthesizing speech from that textual representation. However, the scope of the invention is not limited to any particular environment, application, or specific implementation. Therefore, the description of the embodiments that follows is for purposes of illustration and not limitation.

A network of computing devices generates audible information related to media, such as music or videos. Acting on behalf of a user, one component sends a request for audible commentary to a service, which retrieves the user's media history, information history, and search states. In one variation, an information engine samples segments of a search space that includes multiple data sources. A process then selects novel information, which is based on the user's media history and related data, in the search space. By combining probabilities with statistics gathered from the search space, the process resolves any conflicts in this novel information. The process continues by generating utterances based on the novel information, and the process constructs a textual monolog from those utterances. In a typical embodiment, that textual monolog is synthesized as audible speech, which is then played for the user. Finally, the user's media history, information history, search states, confirmations of delivered information, and other data are recorded for subsequent use.

Figure 1:
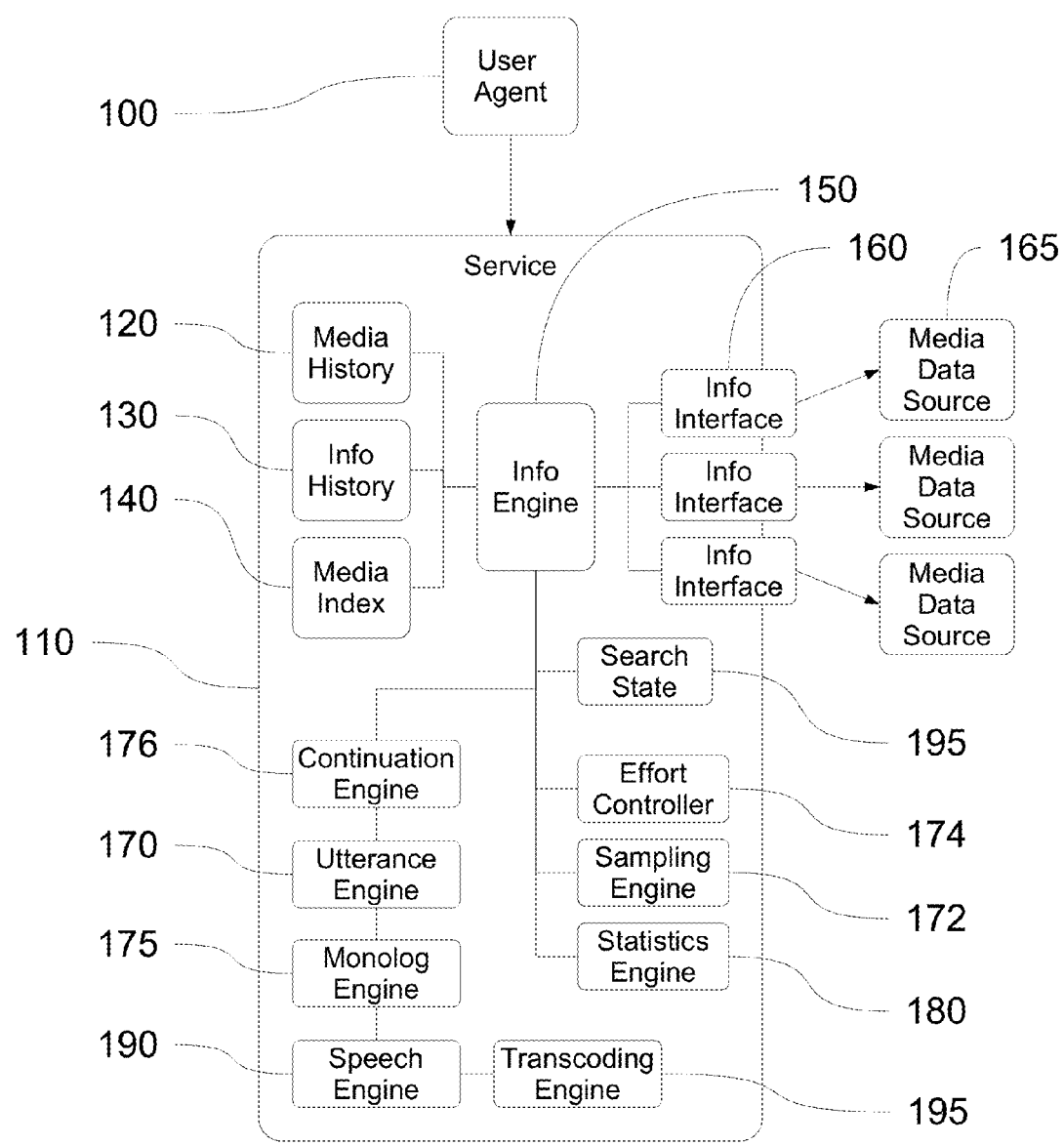
FIG. 1 depicts and exemplary method for generating and delivering audio commentary in response to a request.

FIG. 1 depicts an exemplary method for generating informational audio in response to a request for information about some media, such as a song. User Agent 100, such as smart phone application or Web browser, sends a request to Service 110. The request includes information that identifies the media. In additional, the request comprises or is associated with a user identifier, context of the request, transient user preferences, and the time of the request.

Service 110 retrieves the user's media history from Media History Data Source 120. This history typically comprises a chronology of media previously presented to the user. Service 110 also retrieves the user's information history from Information History Data Source 130, which stores a map from information identifiers to the time information was presented to the user by Service 110. In some embodiments, Service 110 uses Media Index 140 to attempt to identify the media that is the subject of the request. In other embodiments, the request includes an unambiguous media identifier that obviates the need for Media Index 140.

Service 110 then queries Information Engine 150 to find novel information that is relevant to the media, and Information Engine 150 consults multiple Media Information Interfaces 160 that access Media Information Data Sources 165 accessible via an information network. In a typical embodiment, Information Engine 150 first consults a primary Media Information data source 165 to obtain information about the media. Then Information Engine 150 uses some of this information to query additional Media Information Data Sources 165. For example, a primary Media Information Data Source 165 might relate the media to a media identifier used by a secondary Media Information Data Source 165.

Media Information Data Source 165 need not be static. Some data sources will be very dynamic, with ephemeral data such as recent instant messages, events, user comments, and news feeds. Using these data sources, Service 110 can obtain timely data related to media. For example, a social media information data source could subsume or query other users' listening histories. Such a data source could then report when a user's friend recently listened to the same, track, artist, or album. A media event information data source could report when an artist is scheduled to perform near the user's location. For example, a Media Data Source 165 could store artists' performance calendars; therefore, Information Engine 150 could report when a musician appearing on a track is performing at a venue near the user.

In some embodiments, an external messaging service serves provides a channel to a Media Information Data Source 165. A second user sends a message using this external messaging service, and that message is associated with some media. If that second user is related to User Agent 100's user, then the second user's message is available as part of the information for the media. For example, User Agent 100's user U has a set of friends that contains the second user V. User V sends a message via Twitter about some song S. When User U requests audio from Service 110 about song S, the service can relay user V's message to user U. More generally, when user V sends a message that refers to any entity accessible to Service 110, that message can be relayed to user U according. For example, user V might comment that he just bought tickets to a concert by an artist A. If user U listens to a song that artist A played, Service 110 could report to user U that his friend user V bought tickets to see artist A perform. Using this technique, Service 110 acts as a channel for messages from social networks.

To reduce unnecessary work, Information Engine 150 can conduct its search considering the user's information history. For example, if Information Engine 150 knows that the user has recently been presented with some information, then the current search need not bother to look for that particular information this time. Additionally, Information Engine can consider the relevance of accessible information. Similarly, Information Engine 150 might first pursue information that is more closely related to the media.

When User Agent 100 submits a request to Service 110 for text and audio related to some media, Service 110 typically consults various Media Information Data Sources 165 via Information Engine 150 as described more fully above, to find novel, relevant information. An exhaustive search typically would consume more resources, including time, than is economical. Therefore, typical searches should be abbreviated in some manner. The goal of information novelty complicates the process. The search cannot know how novel a information is until it locates it. Additionally, ambiguity in the characterization of the media itself can substantially complicate the search effort. For example, if the request from User Agent 100 does not include an unambiguous media identifier but instead only includes characteristic information, such as title and date, Service 110 might be unable, in some cases, to identify that media in data sources 120. In these cases, Service 110 might only be able to select some candidate matching media information, which could subsequently yield conflicting or partial information about the requested media. For example, request media might be characterized as having a title, date, and artist. Service 110's search for matching media could find not a single match but, say, three: X, Y, and Z. Then, during its search for information, Service 110 might learn that X was produced by A and Y was produced by B. Service 110 may be unable to determine which conclusion is correct or if both conclusions are correct (and the media had two producers).

An embodiment can use multiple techniques to address the challenges. On technique utilizes Sampling Engine 172, which directly repeated, narrow searches in different segments of the search space. This sampling is repeated until some halting criteria are met. For example, novelty and relevance hurdles can serve as halting criteria, which determine when the sampling terminates. Additional, logical circuit breaker can prevent excessive search, returning a empty response. Effort Controller 174 can, in some embodiments, allow an operator to adjust halting criteria dynamically. With this facility, an operator can reduce computational resource consumption when those resources are scarce. The cost is measured primarily in fewer found information.

Another technique involves consuming more computational resources in order to attempt to choose among conflicting information. Continuing the example above, Service 110 might learn that artist A was born in 1926 or 1927. In this case, Service 110 could use Statistics Engine 180 to compute a histogram of found birth years. Then Service 110 can chose the value with the most supporting evidence. More generally Statistics Engine 180 can consider prior probabilities associated with data source, data source segments, or other regions of the search space. With some embodiments, finding one piece of information can suggest others. For example, learning the producer of an audio track can trigger a search for the producer's spouse, which in turn can trigger a search for that spouse's birth date. Since uncertainty can exist at each step, metrics representing uncertainty are propagated throughout processing. By combining the prior information with found information, Statistics Engine 180 can report posterior probabilities for information, and Service 110 can then select information based in part on those statistics. In this manner, Statistics Engine 180 can resolve conflicts in information reported by Media Data Sources 165. If Statistics Engine 180 determines the uncertainty of some information is too great, Statistics Engine 180 can report that determination to Information Engine 150 and Sampling Engine 172. Then Information Engine 150 and Sampling Engine 172 can, if the circumstances warrant, discount the value of that information during their processing.

Additionally, some embodiments use a Continuation Engine 176 to enable incremental, resumable searches for subsequent, repeated requests for some media. Continuation Engine 176, along with Media Search State 195, allows a new request for previously processed media to resume the search from the prior point in the search space. When User Agent 100 first makes request pertaining to some media, Service 110 initiates a search for information, as described above. Typically that search can halt before the entire search space is covered. In this case, data representation the state of the search or equivalently it continuation is written to Media Search State 195 for the user of User Agent 100. When User Agent 100 makes another request for the same media by the same user, Service 110 obtains the necessary search state from Media Search State 195 to resume the search at the point where the search was terminated previously. This technique reduces redundant computation and associated resource consumption. However, since information found previously could, at a much later time, because sufficiently novel to report again, the state stored in Media Search State 195 can be augmented with multiple restart points and associated times those points were obtained.

Information Engine 150 gathers and prioritizes relevant, novel information related to the media. This selection prioritization is typically based on the user's media history, information history, and sampling or search state. In addition, the selection prioritization can be based on estimates of entities' importance. Information Engine 150 or a related component can estimate an entity's importance by considering the amount of information that Media Data Source 165 that relate to the entity. In addition, the age of data related to the entity can also inform estimates of the entity's importance.

Information history represents the information the service has previously reported to the user. Service 110 uses Utterance Engine 170 to generate textual utterances for some of that information. In some embodiments, Monolog Engine 175 might generate multiple utterances in the context of a single request. After obtaining one or more utterances, Service Engine 110 uses Monolog Engine 175 to generate text that represents the utterances. This text can introduce pronouns, other anaphoric expressions, and other natural textual elements. The anaphoric expressions typical reference entities, such as artists and producers that are related to the media. Finally, Service Engine 110 uses Speech Synthesis Engine 190 to synthesize audio from the text provided by Monolog Engine 175. Since different User Agents 110 can require audio in different formats, Service Engine might invoke Audio Transcoding Engine 195 to produce audio in a specified format.

After User Agent 100 has received the synthesized audio from Service 110, User Agent 100 plays that audio for the user at an appropriate time. For example, if the context of the prior request conveyed that the requested audio information was to played after the specified media, User Agent 100 would wait, if necessary, to play the audio for the user. Typically, User Agent 100 pauses any media queue for playback while the audio is playing. The User Agent 100 can resume media playback. In some cases User Agent 100 itself cannot or does not play the audio for the user but instead uses another system for that task. Additionally, User Agent 100 might graphically present the text spoken in the audio. In this manner, a user could both hear and read the information provided by Service 110.

After a component plays the audio for the user, Service 110 typically updates Information History Data Source 130. To enable this behavior, the component playing the audio or User Agent 100 sends a message to Service 100 that confirms that the audio has been played for the user. In other configurations, Service 110 updates information History data source 130 as soon as the text is generated or when the audio is delivered.

The method depicted in FIG. 1 can be implemented as a system comprising computers that are accessible over one or more computer networks. A mobile device or desktop computer hosts User Agent 100, which communicates with one or more servers that operate Information Engine 150 and its associated engines and related components. In a typical variation, distinct servers provide Media Data Sources 165 that Information Interfaces 160 contact. Speech Engine 190 is often provided by a cluster of servers to enable load balancing, caching, fault tolerance, and other related advantages. Similarly, other services can be provided by server clusters. Each server typically includes persistent storage devices, network interfaces, processing units, and components providing ephemeral memory. The mobile device, desktop computer, or similar device includes a speaker or other mechanism to produce the sound representing the generated audio. In one variation, the speaker and sound amplifier are distinct from User Agent 100, allowing User Agent 100 or other component to direct sound to remote speakers in, for example, a car or home.

Figure 2:
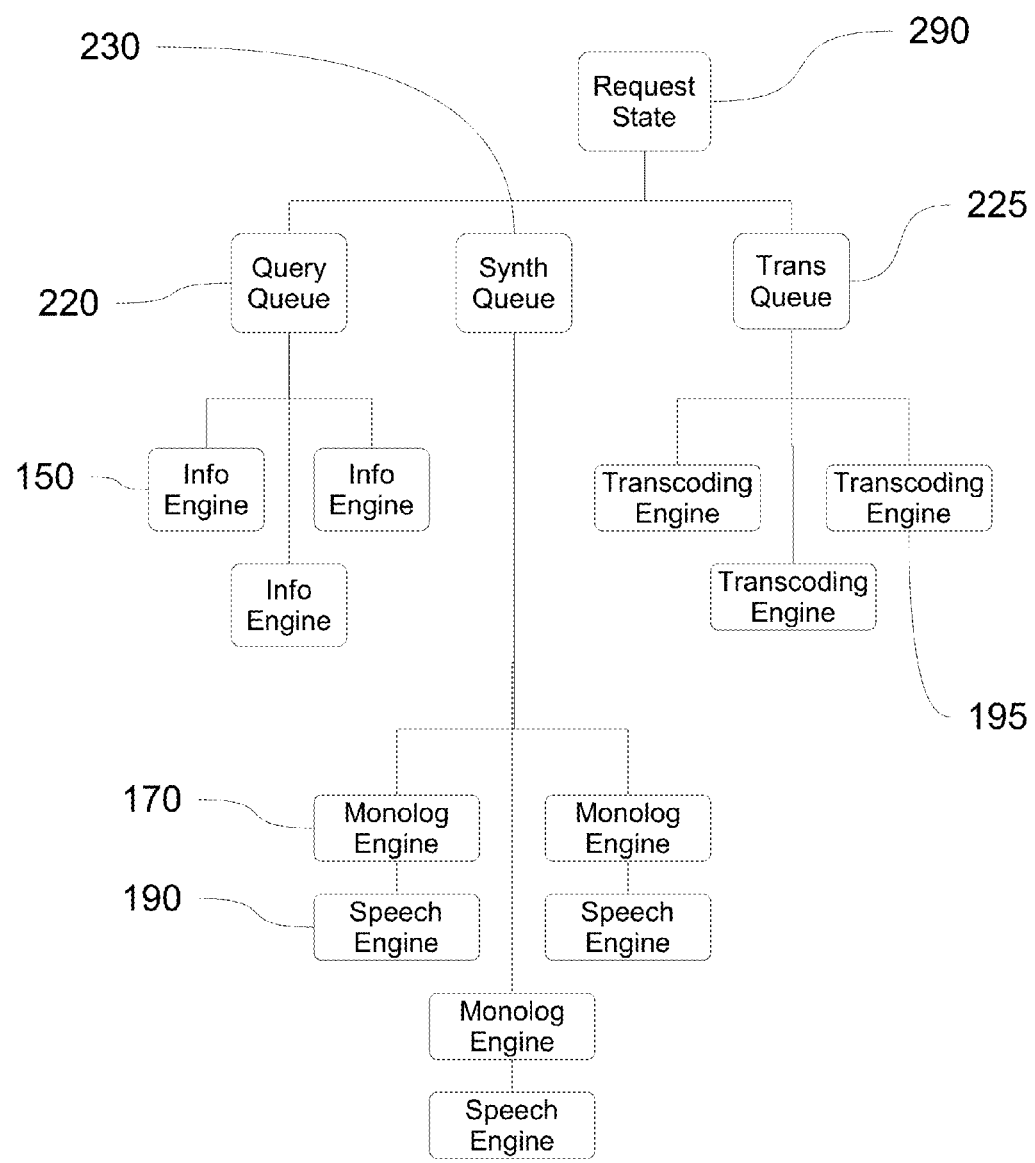
FIG. 2 depicts an exemplary queue system for responding to requests asynchronously.

FIG. 2 depicts an exemplary queue system for responding to requests asynchronously. To facilitate scalability, distributed caches, and deeper searchers, an embodiment might use work queues for various processing stages. For example, Service 110 operates as a distributed system. Each request is queued in Query Queue 220 for subsequent processing by pools of workers using multiple instances of Information Engine 150 and Utterance Engine 170. Utterance Engine 170 or an associated service then enqueues a text synthesis task in Synthesis Queue 230. Worker processes then use multiple instances of Speech Synthesis Engine 190 to generate the requested audio. Additionally, audio transcoding work can be queue in Transcoding Queue 225 for asynchronous transcoding by instances of Audio Transcoding Engine 195.

Using such a workflow, an embodiment might use text identifiers that uniquely identify textual content independent of the request that generated the text. Such identifiers facilitate caching of synthesized audio as well as transcoded audio. For example, many distinct requests might result in the same text "Miles Davis was born in 1926", which would result in multiple synthesized and transcoded audio cache hits when keyed independently of the request. To use this caching technique, Service 110 can associate a text identifier with a request identifier that was returned to the requesting user agent synchronously with the request. Request State Module 290 maintains these associations.

Figure 3:
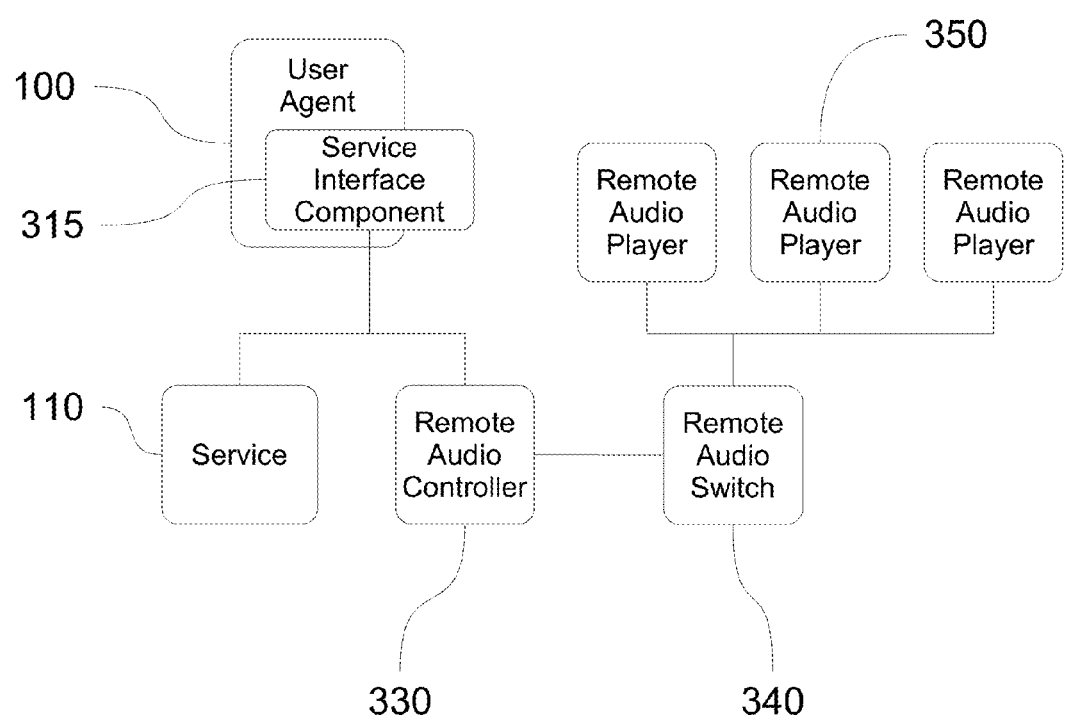
FIG. 3 depicts an exemplary remote audio player system.

FIG. 3 depicts an exemplary remote audio player system. Some User Agents 100 might not allow or enable playback of audio from Service 110. For example, a User Agent 100 might only be equipped to play audio that originates from the same source as the media. In these cases, and embodiment can use a remote audio system, which comprises a Remote Audio Controller 330, a Remote Audio Switch 340, and a Remote Audio Player 350. In one configuration, a Service User Interface Component 315 runs in User Agent 100, and this component sends requests for text to Service 110. Service 110 responds to the component's request with text to be synthesized and played for the user. Then Service User Interface Component 315 sends a message to Remote Audio Player 350 via the network-accessible Remote Audio Controller 330, which communicates with Remote Audio Player 350 using Remote Audio Switch 340. Remote Audio Switch 340 enables a Service Interface Components 315 to communicate with a specified Remote Audio Player 350 among multiple Remote Audio Players. Remote Audio Player 350 then requests speech synthesis from another component or Service 110.

Figure 4:
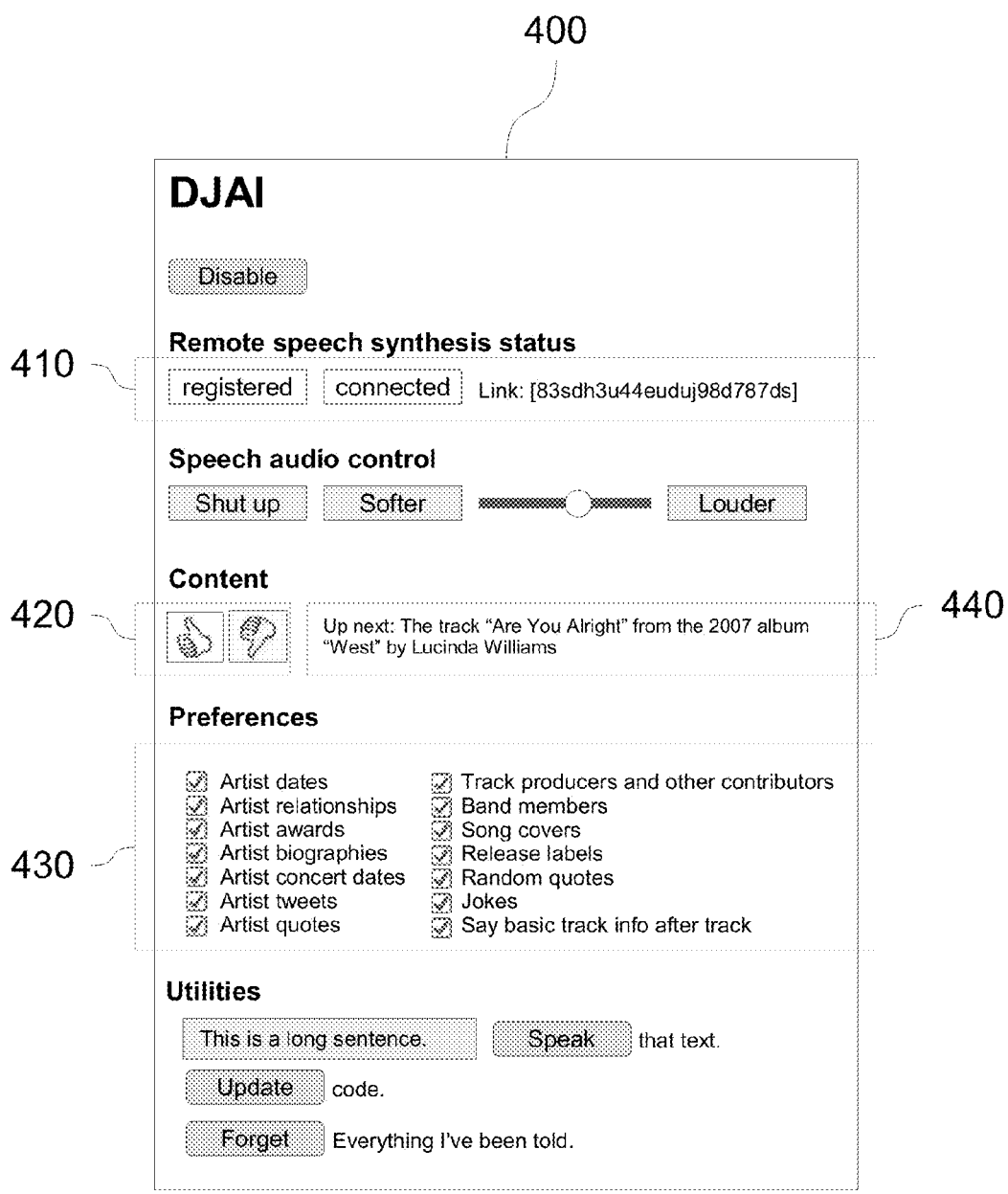
FIG. 4 depicts a user interface component for controlling audio commentary.

FIG. 4 depicts a user interface component for controlling audio commentary. User Interface Pane 400 enables a user to adjust the behavior of Service 100, discussed above in references to FIGS. 1-3. Remote Audio Status Pane 410 indicates connection, registration, and link status for a remote audio system and its components, which are discussed more fully in reference to FIG. 3. This pane reports when a remote control audio connection is established with Remote Audio Controller 330. Additionally, the pane reports when Remote Audio Switch 340 is connected to a Remote Audio Player 350. Some embodiments utilize a link based on a private code in order to facilitate launching Remote Audio Player 350. This example pane displays such a link.

As Service 100 generates content in response to requests by User Agent 100, User Interface Pane 400, as an example, displays the content as text in Content Pane 440. A user can then use user interface Like and Dislike Controls 420 to report whether the user likes or does not like the generated component. User Agent 100 reports that information to Service 100, which updates both user-specific and global models of user preferences that influence how content is generated in the future. Using this mechanism, Service 100 can learn user preferences from these utterance preferences. For example, if a user repeatedly dislikes long biographical information, then Service 100 will reduce or eliminate long biographies provided to the user. When many users express similar sentiments about types of content using user interface options, Service 100 can generate content of that type less frequently for all users. In other words, the selection prioritization and halting criteria can consider these learned utterance preferences.

A wide range of content types are possible. For example, an embodiment could report an artist's recent public messages on a social network. In particular, a Media Data Source 165 could store artists' public messages, and Information Engine 150 could obtain and report relevant public messages. Similarly, an embodiment could report comments the user's friends have made about the media. For example, Media Data Source 165 could comprise a social network service that stores friendship relationships among users. In this example, the data source also stores messages and similar content. When a user's friend publishes content related to the media, Information Engine 150 could selectively report that content to the user. Additionally, using input from Like and Dislike Controls 420, Service 100 could learn which people have commentary that many people like. Then Service 100 can prefer that highly rated content when responding to a request.

More generally, some embodiments enable extensible content sources, each of which provides an interface that produces information in response to a request that comprises some characterization of some media. With such a facility, User Interface Pane 400 could allow a user to select or exclude particular content sources.

Explicit Preference Pane 430 allows a user to exclude types of content that Service 100 might report to the user. For example, a user could explicitly specify that he does not want to hear any biographical information or artist quotes. Then, on subsequent requests to Service 100, Service 100 will not generate content of those excluded types.

Many other settings are possible. For example, some embodiments provide a user interface range control, such as a slider, to enable the user to indicate how much content to generate. For example, a user could request more content in each response. In this example, Service 100 could generate content that represents several facts and respond with multi-sentence monologs when sufficient data is available. Similarly, User Interface Pane 400 could provide a control that influences when Service 100 repeats content. In typical embodiments, Service 100 tends to prefer content that has never been reported or has not been reported recently to content that has been recently reported. A user control in User Interface Pane 400 could enable the user to control the degree of preference in this regard.

The diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in information, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise, it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations wilt be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof it will be apparent that modifications and variations are possible without departing from the scope of the invention defined in the appended claims.

The figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise, it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations wilt be apparent to those of skill

What is claimed is:

1. A computer-implementable method for generating audible information related to media, the method comprising:
sending a request for audible commentary to a service from a user agent controlled by a user;
retrieving the user's media history, information history, search states;
sampling segments of a search space comprising data sources;
selecting novel information in the search space;
generating utterances based on a the selected novel information;
constructing a textual monolog from the generated utterances;
synthesizing speech from the textual monolog;
playing the synthesized speech for the user using a speaker; and
updating the user's media history, information history, and search states after confirmation that the user received the monolog.

2. The method of claim 1, wherein the selecting is based on the user's media history, information history, and search state.

3. The method of claim 2, wherein the user can use a user interface to report utterance preferences that indicate the user likes or does not like the utterances.

4. The method of claim 3, wherein the user interface comprises options for types of content to utter.

5. The method of claim 4, wherein the selecting is further based on the utterance preferences and the options.

6. The method of claim 5, wherein the information history comprises data that indicate when prior utterances referenced each entity.

7. The method of claim 6, wherein constructing the textual monolog comprises generating anaphora.

8. A system for generating audible information related to media, the system comprising:
a user agent operable to make requests for spoken audio related to the media;
data sources that stores data related to the media;
an information engine operable to sample the data sources to generate information about the media;
an effort controller that enables an operator to adjust halting criteria that determine when the sampling terminates;
a continuation engine that enables the information engine to resume sampling for a subsequent request;
an utterance engine operable to generate utterances based on the information obtained from the information engine;
a monolog engine operable to generate a textual monolog based on the utterances;
a speech engine operable to generated spoken audio from the textual monolog; and
a speaker operable to emit the spoken audio audibly.

9. The system of claim 8, wherein the information engine selects information from data sources based on the user's media history, information history, and search state.

10. The system of claim 9, wherein the user can use a user interface to report utterance preferences that indicate that the user likes or does not like the utterances.

11. The system of claim 10, wherein the user interface comprises options for types of content to utter.

12. The system of claim 11, wherein the information engine selects information from data sources based on the utterance preferences and the options.

13. The system of claim 12, wherein the information history comprises data that indicate when prior utterances referenced each entity.

14. The system of claim 13, wherein constructing the textual monolog comprises generating anaphora.

15. The system of claim 14, the system further comprising a statistics engine operable to report uncertain information.

16. The system of claim 15, wherein one of the data sources stores messages from artists related to the media.

17. The system of claim 16, wherein the information engine obtains messages, which relate to the media, from the user's friends on the social network.

* * * * *